(12) United States Patent
Heyl

(10) Patent No.: US 6,928,831 B2
(45) Date of Patent: Aug. 16, 2005

(54) COMBINED COOLING PLANT/HEAT PUMP FOR COOLING, HEATING AND DEHUMIDIFYING A MOTOR VEHICLE INTERIOR

(75) Inventor: Peter Heyl, Cologne (DE)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 10/712,700

(22) Filed: Nov. 13, 2003

(65) Prior Publication Data

US 2004/0134216 A1 Jul. 15, 2004

(30) Foreign Application Priority Data

Nov. 13, 2002 (DE) .......................... 102 53 357

(51) Int. Cl.⁷ .............................................. F25B 13/00
(52) U.S. Cl. ..................... 62/324.1; 62/159; 62/239; 62/93
(58) Field of Search ..................... 62/159, 180, 196.4, 62/324.1, 911, 239, 93

(56) References Cited

U.S. PATENT DOCUMENTS

| 2,460,774 | A | | 2/1949 | Trautman |
|---|---|---|---|---|
| 3,490,338 | A | | 1/1970 | Faust et al. |
| 3,985,154 | A | | 10/1976 | Hargraves |
| 4,255,939 | A | | 3/1981 | Ou |
| 4,290,453 | A | | 9/1981 | Bauer |
| 4,966,194 | A | | 10/1990 | Nakatsukasa et al. |
| 5,179,998 | A | * | 1/1993 | Des Champs ............... 165/222 |
| 5,355,689 | A | * | 10/1994 | Hara et al. .................... 62/159 |
| 5,375,427 | A | | 12/1994 | Hara et al. |
| 5,598,887 | A | * | 2/1997 | Ikeda et al. ................ 165/202 |
| 5,689,962 | A | | 11/1997 | Rafalovich |
| 5,709,102 | A | | 1/1998 | Fukumoto et al. |
| 5,799,728 | A | * | 9/1998 | Blume ....................... 165/231 |
| 5,819,551 | A | | 10/1998 | Fukumoto et al. |

* cited by examiner

*Primary Examiner*—Melvin Jones
(74) *Attorney, Agent, or Firm*—Brinks Hofer Gilson & Lione

(57) ABSTRACT

The invention relates to a combined cooling plant/heat pump for use in motor vehicles for the cooling, heating and dehumidification of the vehicle interior. A refrigerant circuit is thermally coupled to the ventilation system over an internal heat exchanger having two functional units. The functional units are switchable as the condenser/gas cooler of the heat pump (in heating operation) and as the evaporator of the cooling plant (in cooling operation). In a combined dehumidification-reheating operation, one of these functional units is operable as an evaporator and the other as condenser/gas cooler.

8 Claims, 10 Drawing Sheets

COMBINED COOLING PLANT/HEAT PUMP FOR COOLING, HEATING AND DEHUMIDIFYING A MOTOR VEHICLE INTERIOR

BACKGROUND OF THE INVENTION

1. Field of the Invention

The invention relates to a combined cooling plant/heat pump for use in motor vehicles for the cooling, heating and dehumidification of the vehicle interior by means of a ventilation system.

2. Related Technology

Ventilation systems of motor vehicles have to meet a number of requirements. First, the system has to be capable of heating the air entering the passenger compartment in cold weather. More and more, vehicles are also provided with air conditioning units that are capable of cooling the air entering the passenger compartment in hot weather.

When a an air conditioning unit is used for cooling purposes, it is possible, especially in the transitional periods between warm and cold seasons, to reduce the humidity of the air entering the passenger compartment. In doing so, the evaporator of the air conditioning unit is used for the dehumidification of the air, which then is heated by the heater core of the engine cooling circuit to the desired temperature. In this way it is possible to effectively prevent the vehicle windows from fogging.

As an introduction to understand the invention better, a typical state-of-the-art realization of this combined operation is represented in FIG. 1.

The engine cooling system 2, in its simplest form, includes a cooling circuit usually working based on a glycol-water mixture (the coolant), and a pump 12 that circulates the coolant through the engine or the driving aggregate 13 of the vehicle to a thermostatic valve 14, from where, depending on the demand, the coolant flows to either the heater core 5 of the ventilation system 3 or to the radiator 15, or both, after which the circuit is dosed at the pump 12.

The air conditioning unit 1 includes a compressor 6, which compresses a refrigerant, an exterior heat exchanger 7, an inner heat exchanger 8 on the high-pressure side of the system 1 and an expansion valve 9. After the expansion valve 9, the decompressed refrigerant flows into an internal heat exchanger/evaporator 4, which is positioned in the ventilation system 3 and which provides for the dehumidification of air 16 entering in transitional weather and the cooling of the air in warmer weather. The subsequent heating of the dehumidified and cooled air that is to enter the passenger compartment is also known as "reheating". The direction of the airflow in the ventilation system 3 is indicated by the arrow 16.

After the evaporator 4, the refrigerant passes to an accumulator 10, where liquid and gas are separated from each other and stored, and to an inner heat exchanger 11 on the low-pressure side of the system 1, and finally flowing to the compressor 6 closing the circuit.

Existing systems that present a combined cooling plant and heat pump for automotive vehicles are also known. Such a system is shown in FIG. 2.

In the system of FIG. 2, the refrigerant circuit of an air conditioning unit 1 is combined with the engine cooling system 2 and the ventilation system 3 of the vehicle. In this case the cooling circuit of the engine cooling system 2 is extended by a coupling heat exchanger 17 arranged between the refrigerant circuit and the engine cooling circuit as a further consumer or user of the engine's heat energy. This coupling heat exchanger 17 exploits the heat of the engine cooling circuit to evaporate the refrigerant of the refrigerant circuit and therefore provides the air conditioning unit with this heat as evaporation heat.

For the reheating operation in the air conditioning mode, the cooling circuit of the engine cooling system 2 is used in both systems. For that a heater core 5 is provided. Thus during operation of the air conditioning unit 1, air is dehumidified by the evaporator 4 and then heated by the heater core 5.

In the heat pump mode, heat of the engine cooling system 2 is transferred via the coupling heat exchanger 17 to the refrigerant circuit of the air conditioning unit 1 which supplies the heat to the air flowing into the passenger compartment in the internal heat exchanger 4 functioning as condenser/gas cooler. For a highly efficient and dynamic system, it is advantageous if the air 16 flowing into the passenger compartment does not pass the heater core 5 in this operational mode. This is achieved through a valve position in the air distribution chamber of the ventilation system 3, also known as the heating, ventilation, and air conditioning ("HVAC") system.

In this case, the air conditioning unit 1 or the engine cooling system 2, respectively, is extended by the coupling heat exchanger 17 and corresponding switching valves and other components compared to the previously mentioned system.

The systems described above have the disadvantage that the heat exchangers needed are very expensive and their usual design versions take up a lot of space, which is very disadvantageous for mobile applications.

It is the objective of the invention to modify a device such that the task of heat exchanging in the ventilation system of a vehicle is realized in a space-saving way.

BRIEF SUMMARY OF THE INVENTION

According to the invention, the problem is solved by a combined cooling plant/heat pump for use in motor vehicles to cool, heat and dehumidify the vehicle interior by means of a ventilation system in which the refrigerant circuit of the cooling plant/heat pump is thermally coupled to the ventilation system over an internal heat exchanger system. The internal heat exchanger system has two functional units with the functional units switched in the heating operational mode as condenser/gas cooler of the heat pump and in the cooling operational mode as evaporator of the cooling plant, whereby in the dehumidifying operational mode with reheating in the transitional periods, one functional unit of the internal heat exchanger system is switched as the evaporator and another functional unit is switched as the condenser/gas cooler.

Advantageously the internal heat exchanger system is designed such that in the refrigerant circuit with the two functional units, the two functional units are adapted to function as a heat exchanger. Thereby a heat exchanger is modified such that a portion of its capacity functions as evaporator and another portion of its capacity functions as condenser/gas cooler, but both functional units can also uniformly function as condenser or evaporator.

The above mentioned principle of operation, particularly of the combined operation with the two functional units, requires, to switch these functional units, two multi-way valves according to one embodiment of the invention.

First of all, the advantage of the solution according to the invention is that the heat exchanger of the engine cooling circuit can be saved and thus one component compared to conventional designs, is saved. Instead of the saved heat exchanger, only one or two, respectively, additional valves are necessary in the realization of the invention for the circuit of the invention.

The special advantage of the invention is that the solution can be used in future innovative concepts of air conditioning units, which realize heating and cooling by the combination of a cooling plant and a heat pump. This allows in spring/autumn, i.e. in transitional periods, the combination of cooling/dehumidifying in part-load mode and heating in the reheating mode by the cooling plant/heat pump at the same time. Therefore the refrigerant air heat exchanger of the engine cooling circuit, currently necessary in the ventilation system for the reheating operation and in winter for heating, can be eliminated as mentioned above.

According to the concept of the invention, in combined cooling and heating operation for dehumidification in transitional periods (autumn/spring), the compressor of the air conditioning system is put into operation for dehumidification. The thermodynamic process makes it necessary that heat is not only absorbed in the evaporator, but also released in the condenser/gas cooler for dehumidification. This heat is available for the system and used for the heating of the air in reheating operation.

In winter at very cold temperatures, the heat pump operational mode is used. If the heat of the engine is sufficient, then the refrigerant is used as a heat carrier that transports the heat from the glycol heat exchanger to the interior heat exchanger, or the internal heat exchanger, respectively. The compressor only overcomes the pressure losses in the system and hence works as a pump.

Cooling operation is as usual in a conventional vehicle air conditioning unit.

The invention is especially advantageous in that the future cooling plant/heat pump systems compressors without a coupling are used. This means that the compressor is continuously operated.

Therefore, the air conditioning system will be continuously usable in summer and winter for heating or cooling, respectively. Hereby the unit is operated in full-load operational mode in each case, 100% heating without dehumidification at very cold temperatures in winter or 100% cooling without reheating at very hot temperatures in summer. The internal heat exchanger of the ventilation system is exclusively used as an evaporator or gas cooler/condenser. Particular advantages are offered by a cooling plant/heat pump which uses carbon dioxide as the refrigerant.

In most applications the unit is operated in part-load and under environmental conditions that require cooling/dehumidifying and heating. Part-load means that only a portion of the maximum capacity of the system or the components is needed. As there are two heat exchangers necessary for dehumidification and subsequent heating, however, the internal heat exchanger is subdivided into two functional units according the concept of the invention. For this application the heat exchanger will simultaneously function as evaporator and gas cooler/condenser.

According to the concept of the invention, the cooling plant/heat pump is operated such that in combined dehumidification/reheating operational mode the refrigerant mass flow is passed over one of the functional units to supply heat for reheating and then, after decompression, over the other of the functional units to dehumidify the air.

According to an advantageous embodiment of the invention, in the combined dehumidification/reheating operational mode the refrigerant mass flow downstream of the compressor is divided into partial flows, one partial flow is used for reheating and another partial flow is used for the dehumidification in the respective functional units. The refrigerant partial flows are then reunited before compression, depending on the design of the circuit.

Another advantageous embodiment of the invention is realized in that the functional units are connected to an expansion element, which has a bypass and can be passed in both directions, and another expansion valve, which has a bypass and can be passed in both directions, is provided in the refrigerant circuit. Here, it is essential that in the bypass position, the expansion valve with bypass does not restrict flow, but opens fully.

It is highly advantageous that, according to another embodiment of the invention, a coupling heating exchanger functions as heat source for the heat pump operation, which thermally couples the refrigerant circuit of the cooling plant/heat pump and the coolant circuit of the engine cooling system. Thereby heat from the coolant circuit of the engine cooling system is transferred to the refrigerant circuit of the cooling plant/heat pump.

It is equally advantageous to provide, for the heat pump operation, an air heat exchanger as the heat source, which in heat pump operation transfers heat from the air to the refrigerant circuit of the cooling plant/heat pump.

In another embodiment, the internal heat exchanger system a heating heat exchanger of the engine cooling circuit is additionally integrated into the ventilation system. In this way a mixed operation, or supported heating operation of the total system can be carried out.

An the advantage of this modified solution according to the invention, is that the heat exchanger of the engine cooling circuit can be designed with smaller dimensions.

BRIEF DESCRIPTION OF THE DRAWINGS

Other details, features and advantages of the invention will be understood by reading the following description of examples of embodiments with reference to the accompanying drawings in which.

DETAILED DESCRIPTION OF THE INVENTION

Figure 1:
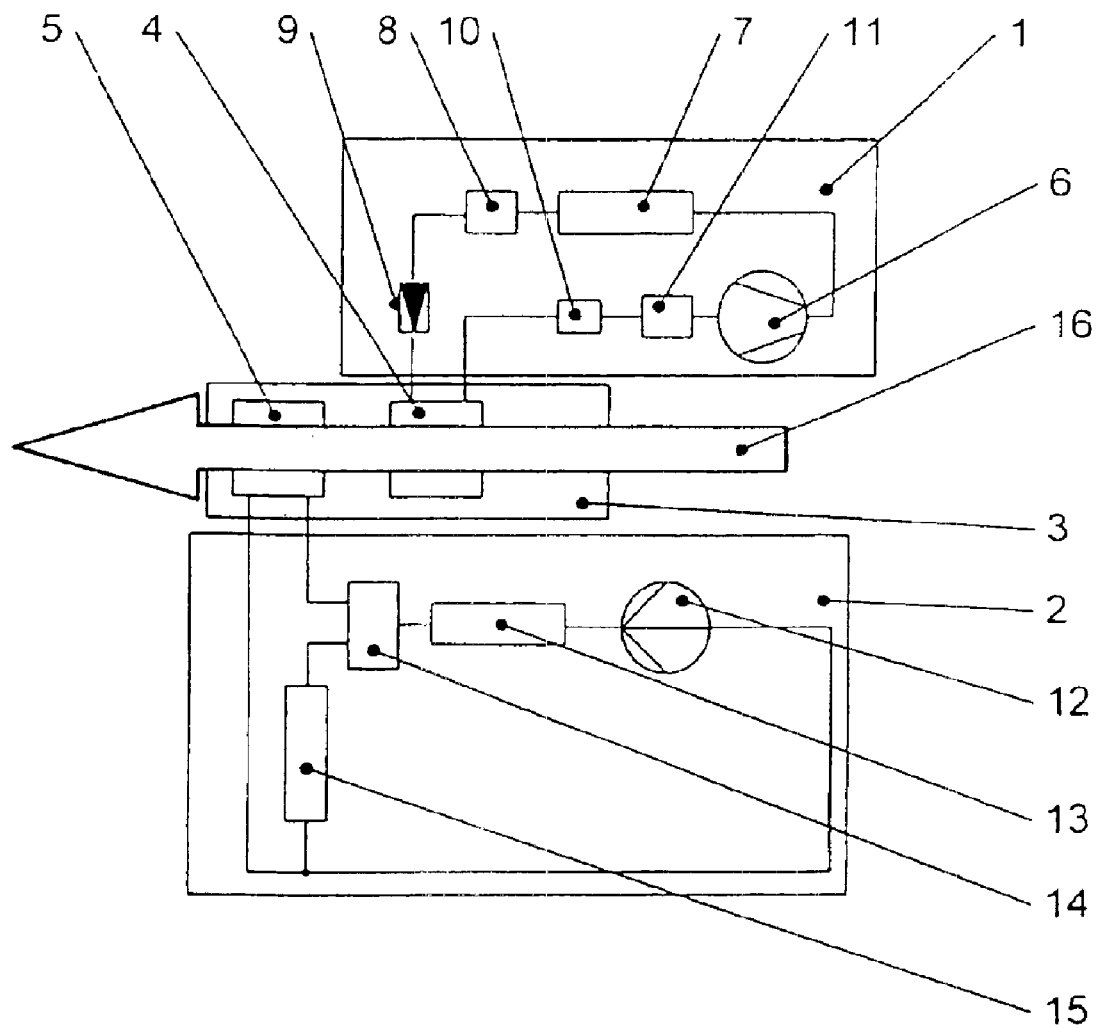
FIG. 1 is a flow diagram of prior art cooling plant of engine cooling and ventilation system.
Figure 2:
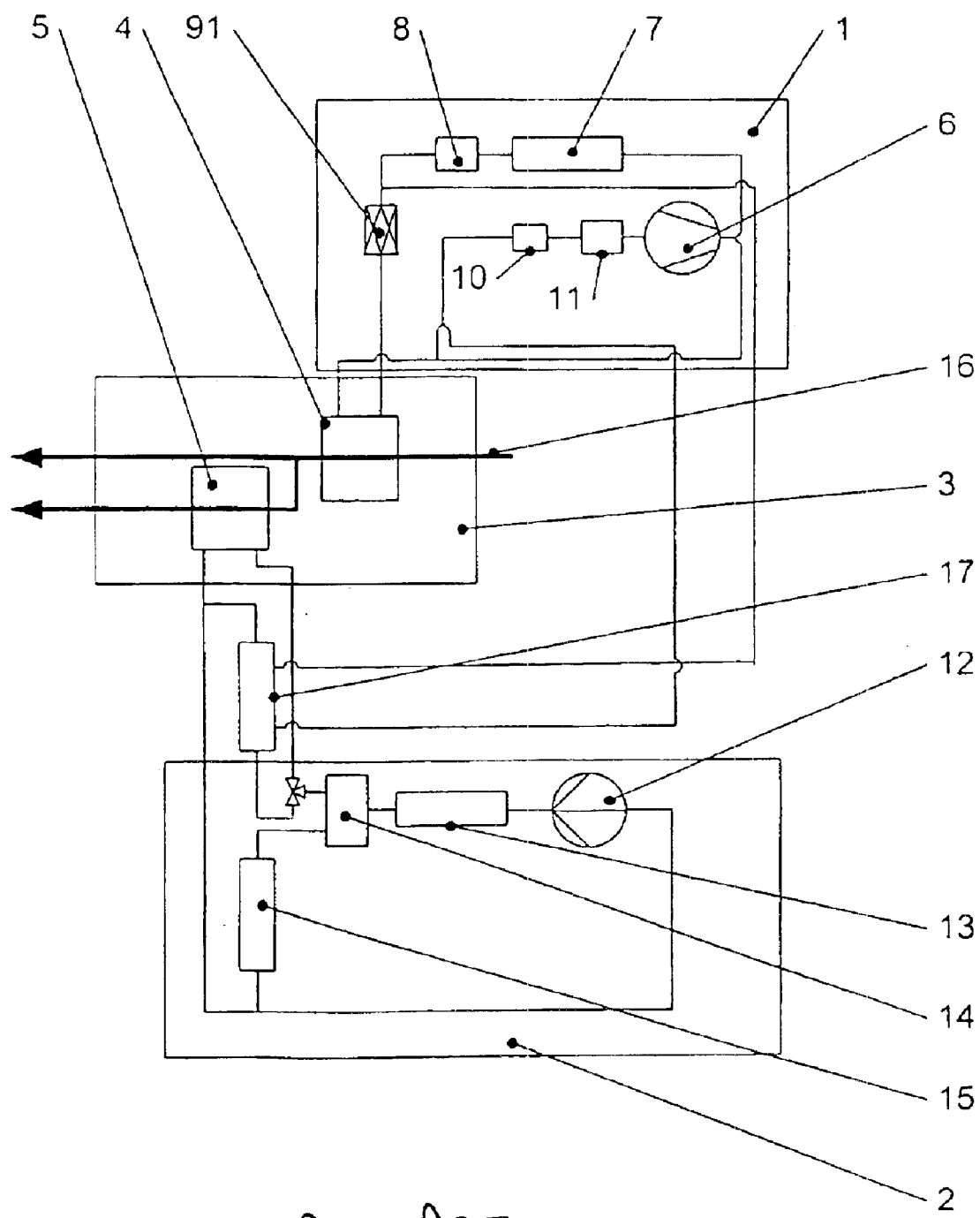
FIG. 2 shows a prior art combined cooling plant/heat pump as refrigerant circuit and modified engine cooling circuit with glycol heat exchanger and heating heat exchanger in the ventilation system.
Figure 3:
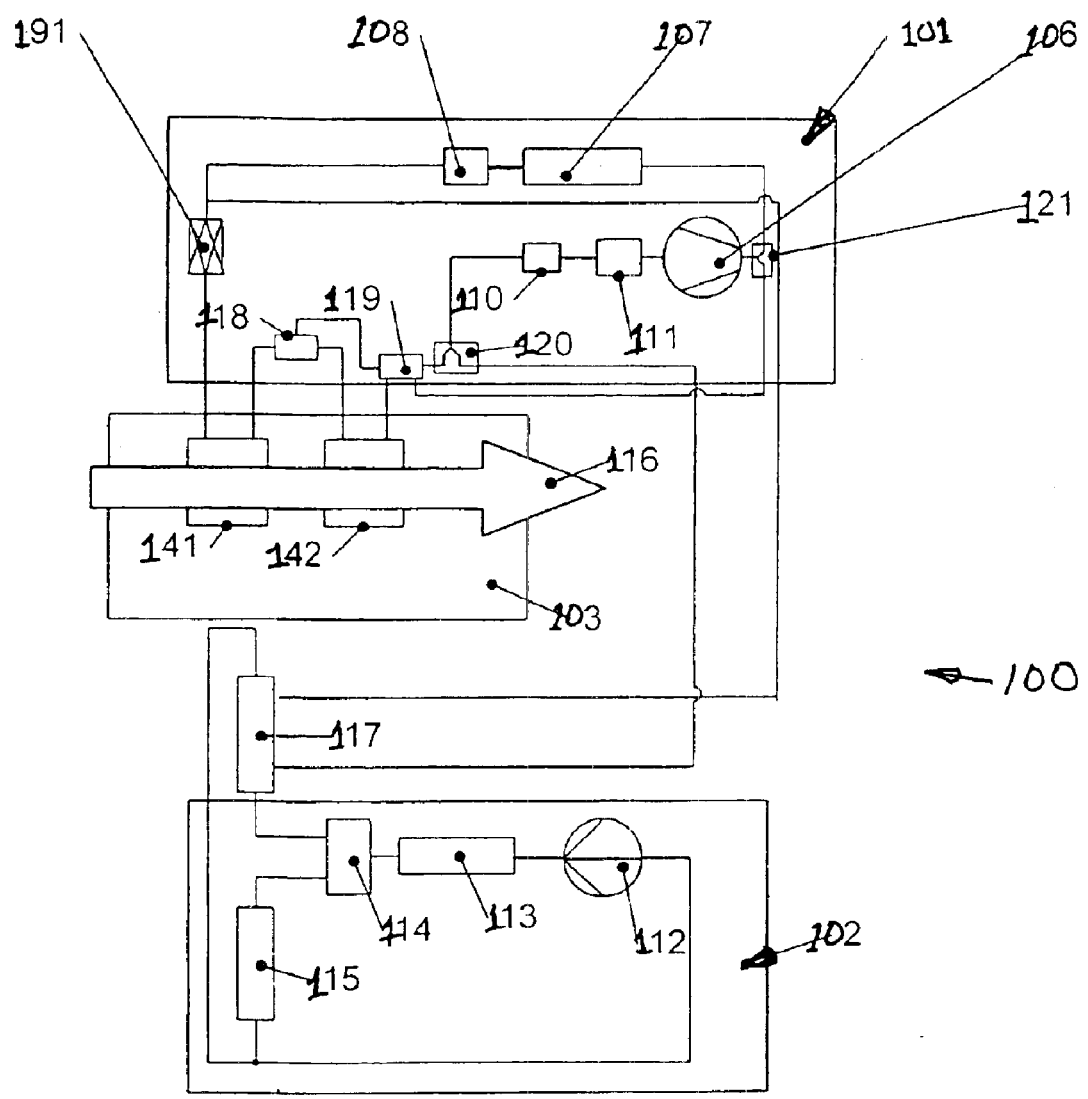
FIG. 3 shows a combined cooling plant/heat pump with internal heat exchanger system consisting of two functional units in the refrigerant circuit.

Referring now in detail to the drawings, FIG. 3 shows a preferred embodiment of the invention by means of a circuit diagram. In addition to cooling and heating, this system 100 also ensures a very comfortable dehumidification in the reheating operation of the system 100.

The main components of the total system 100 according to the invention, include a cooling plant/heat pump 101, a cooling circuit 102 and a ventilation system 103 of the vehicle.

In cooling plant operation, the refrigerant (preferably carbon dioxide) is compressed to a high-pressure state in the compressor 106, passes the multi-way valve C 121 and is cooled in the external heat exchanger 107. It then passes the high-pressure side of the inner heat exchanger 108, is released in the expansion element 191, which is passable in both directions, and finally flows into the functional unit A 141 and over the multi-way valve D 118 into the functional unit B 142 of the internal heat exchanger. The refrigerant passes the functional units A 141 and B 142 and absorbs heat from the air flowing in the direction of the arrow 16.

From the functional unit B 142, the refrigerant flows over a multi-way valve A 119 and a multi-way valve B 120, as well as an accumulator 110 and a low-pressure side of the internal heat exchanger 111, thereafter to the compressor 106, closing the circuit.

In heat pump operation or heating mode of the system 100, the refrigerant vapor is compressed in the compressor 106 and flows over the multi-way valve C 121 where it is directed to multi-way valve A 119 and into the functional unit B 142. Thereafter it flows over the multi-way valve D 118 into the functional unit A 141 of the internal heat exchanger system. In functional unit A 141, the carbon dioxide is super- or subcritically cooled by the air current, flowing in the direction 16.

The cooled or condensed refrigerant next passes to the expansion element 191, which is passable in both directions, and then to the coupling heat exchanger 117 which transfers heat from the engine cooling circuit 102 to the refrigerant circuit of the cooling plant/heat pump 101. In this mode, the coupling heat exchanger 117 works as evaporator. The refrigerant vapor finally flows over the multi-way valve B 120 to the accumulator 110 over the low-pressure side of the inner heat exchanger 111 and to the compressor 106, closing the loop.

In spring/autumn, i.e. the transitional periods, reheating is required, i.e. dehumidification of the air entering the passenger compartment with subsequent heating of the air. This is carried out to condition the heated air so that it does not condense on the windows, which would deteriorate the sight conditions in the passenger compartment of the vehicle.

In dehumidification or reheating operation, respectively, the refrigerant is compressed in the compressor 106 and then divided into two mass flows in the multi-way valve C 121. The first mass flow portion flows over the multi-way valve A 119 into the functional unit B 142 of the internal heat exchanger system and is cooled there releasing heat and thus realizing reheating in the ventilation system 103. This refrigerant vapor finally flows over the multi-way valve D 118, where it is passed, back to the multi-way valve A 119 and over the multi-way valve B 120 to the accumulator 110 and the low-pressure side of the inner heat exchanger 111 and finally to the compressor 106 to be compressed.

The second mass flow portion flows over the multi-way valve C 121 into the external heat exchanger 107, the inner heat exchanger/high-pressure side 108, the expansion element 191 into the functional unit A 141 of the internal heat exchanger system, which carries out an evaporation of the refrigerant and cooling of the air 116 to dehumidify it. The resulting refrigerant vapor unites in the multi-way valve D 118 with the refrigerant from the functional unit B 142.

The cooling power is controlled, e.g. through the rotational speed of the ventilator, or fan of the external heat exchanger 107 whereby the overheating of the refrigerant in the functional unit A 141 can be influenced.

Figure 6:
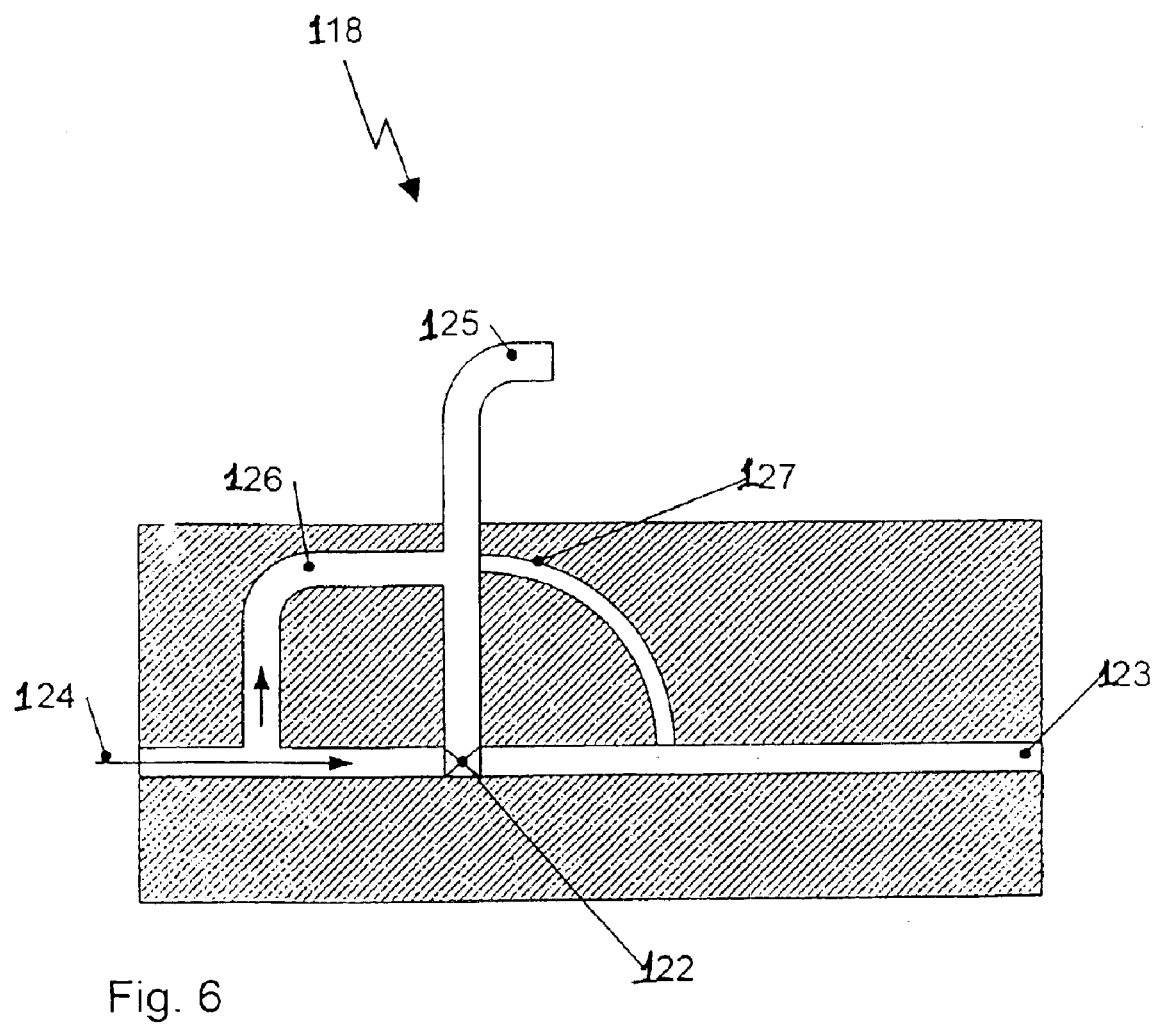
FIG. 6 shows the multi-way valve 18.

The multi-way valve C 121 is designed with a plurality of positions. In separate heating or cooling operations, it is 100% open in each position. During combined cooling and heating operation, it can be 100% open in both directions for cooling or heating. In each case, the overall system is controlled by the expansion element 191, or the orifice 127 as seen in FIG. 6. Alternatively, the multi-way valve C 121 is clocked and allows in each direction only the needed amount of refrigerant to pass.

During separate heating or cooling, the multi-way valve D 118 opens the full flow cross-section to avoid any significant negative effect on the pressure. It is not necessary to dose the path to the multi-way valve A 119 and this passage must only be interrupted on switching to combined cooling and heating so that the low-pressure refrigerant or carbon dioxide has a free cross-section and the high-pressure refrigerant/carbon dioxide is restricted by a narrow cross-section. This is designed as a fixed or a controllable restrictor. Downstream in multi-way valve D 118, both flows mix and flow in direction of multi-way valve A 119.

According to the concept of the invention, two mass flows are used in the dehumidification/reheating operation. The different mass flows are reunited within the circuit, but upstream of the compressor 106 at the latest.

The particular advantage of this embodiment is that a separate heating heat exchanger in the ventilation system 103 is not required and therefore needed space requirements decrease.

Another problem can be reduced passively using this circuit. After operation of the system in the cooling plant mode, humidity can have accumulated in the evaporator. When the plant is then switched over to the heat pump mode, flash fogging can occur. If the plant, however, is operated in combined mode and it is ensured that only the cooling plant part is initially operated, the cooled and dried air will dry the functional unit B 142 when passing over it. When the functional unit B 142 has been dried such that flash fogging does not occur any longer, also the heating circuit is put into operation.

In the design of the multi-way valve D 118, it should be noted, the throttling cross-section is adapted to be continuously controllable or designed as a fixed cross-section restrictor. The multi-way valve D 118 of the invention is shown in FIG. 6.

Oil circulation in the refrigerant circuit is ensured by a corresponding speed change of the compressor, the piston stroke or circuit switchings.

Based on a combined temperature/humidity sensor, a controller makes the decision whether the combined circuit or a separate heating or cooling circuit is used.

If carbon dioxide is used as the refrigerant, a special effect is achieved in that the expansion valve 191 is passable in both directions and in separate heating operational mode is adapted such that it can be opened to have approximately the diameter of the tube cross-section. Alternatively, a bypass, at a certain valve position, can be released. This is necessary, if in heating operation the refrigerant circuit works only as heat carrier circuit, which is the case when the glycol circuit or the coolant circuit of the engine cooling system 102 is heated and the refrigerant carbon dioxide transports the heat into the interior of the vehicle. If carbon dioxide is used as the refrigerant, it is advantageous and possible according to the invention that the process is realized outside the two-phase region.

Figure 4:
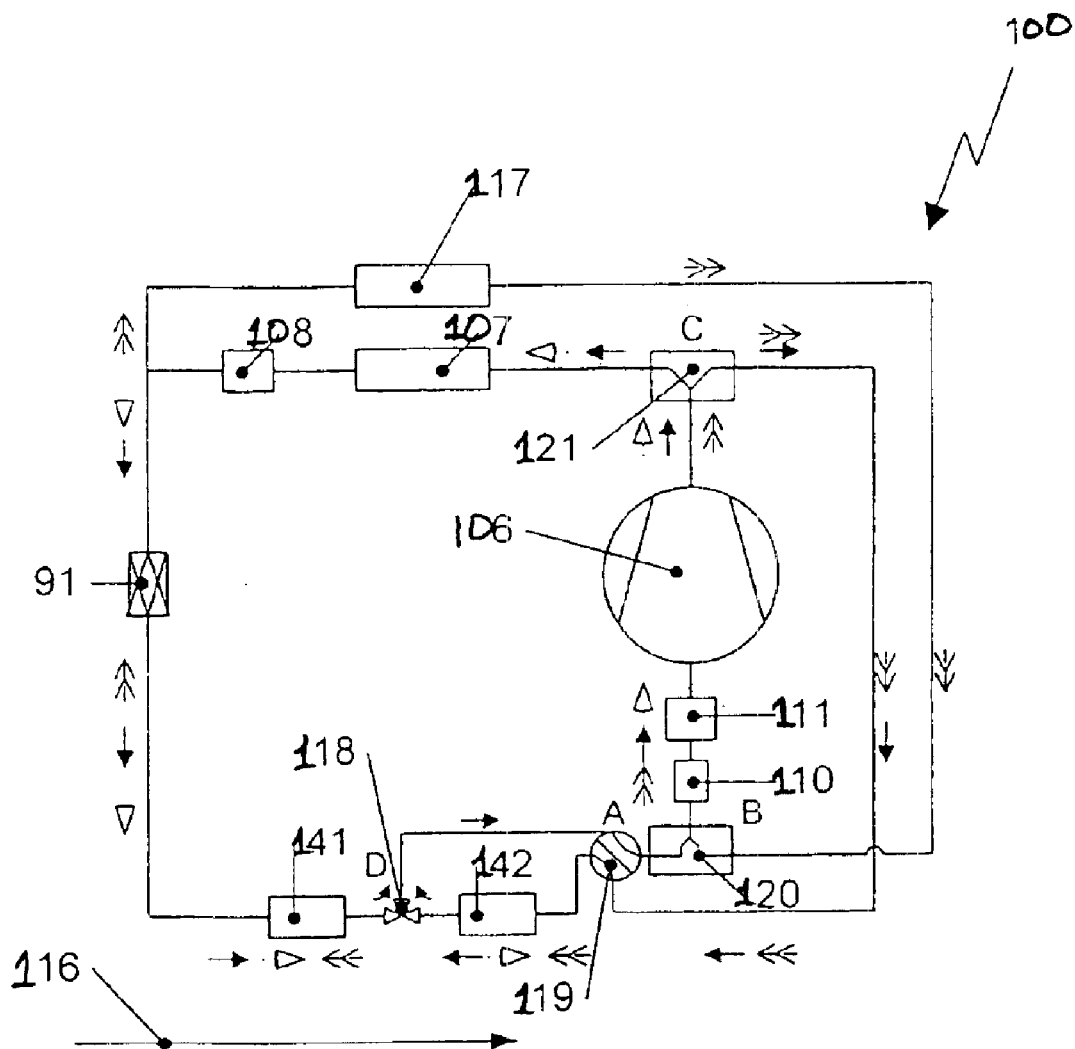
FIG. 4 shows a cooling plant/heat pump with 6/2- and 3/2-direction valve.
Figure 5:
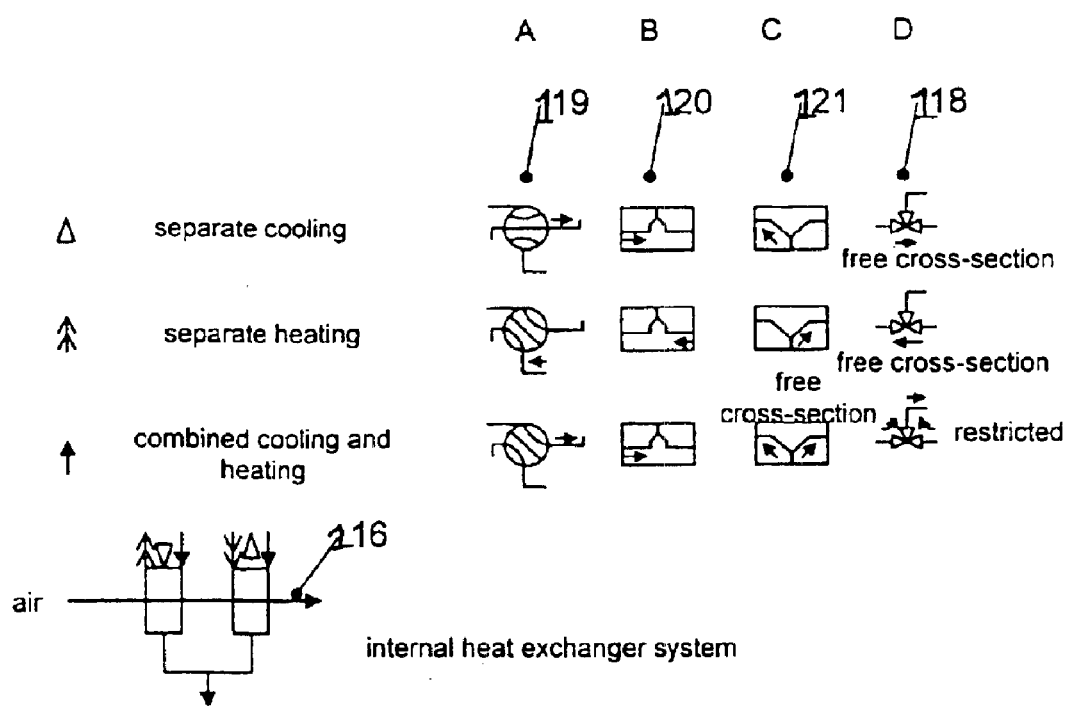
FIG. 5 is a survey on the valve positions of the multi-way valves A, B, C and D.

In FIG. 4 the various processes of the invention are schematically shown by different arrows. The operational mode represented by each of the arrows is indicated in FIG. 5. FIG. 5 shows a survey of the valve positions of the multi-way valves A, B, C and D 119, 120, 121 and 118, whereby the operational modes (separate cooling, separate heating and combined cooling and heating) are given the corresponding arrows.

The multi-way valve D 118 (seen in FIG. 6) is, according to the invention, designed such that the tube cross-section can be totally closed or totally opened by a closing element 122. The connection 123 leads to the functional unit B 142 and the connection 124 leads to the functional unit A 141. The connection 125 is connected to the multi-way valve A 119. In addition to the tube cross-section directly connecting the connections 123 and 124, another duct 126 is provided for the combined cooling plant/heat pump operational mode, i.e. then when the closing element 122 closes the direct connection between 123 and 124. The refrigerant flow coming from the functional unit B 142, in the combined operation, is restricted in the multi-way valve D 118 by the fixed orifice 127 and then unites with the refrigerant vapor from the functional unit A 141 and flows as described over the connection 125 to the multi-way valve A 119. Equally advantageously the invention can be realized such that the orifice 127 can be adapted to be a controllable expansion element.

In yet another advantageous embodiment, multi-way valve D 118 can be combined into a structural unit with the multi-way valve A 119. If the orifice 127 is arranged in the multi-way valve A 119, the path can also be designed as a controllable valve such that on switching-in the solenoid adjusts the blocking valve and then controls the position of the expansion valve.

Figure 7:
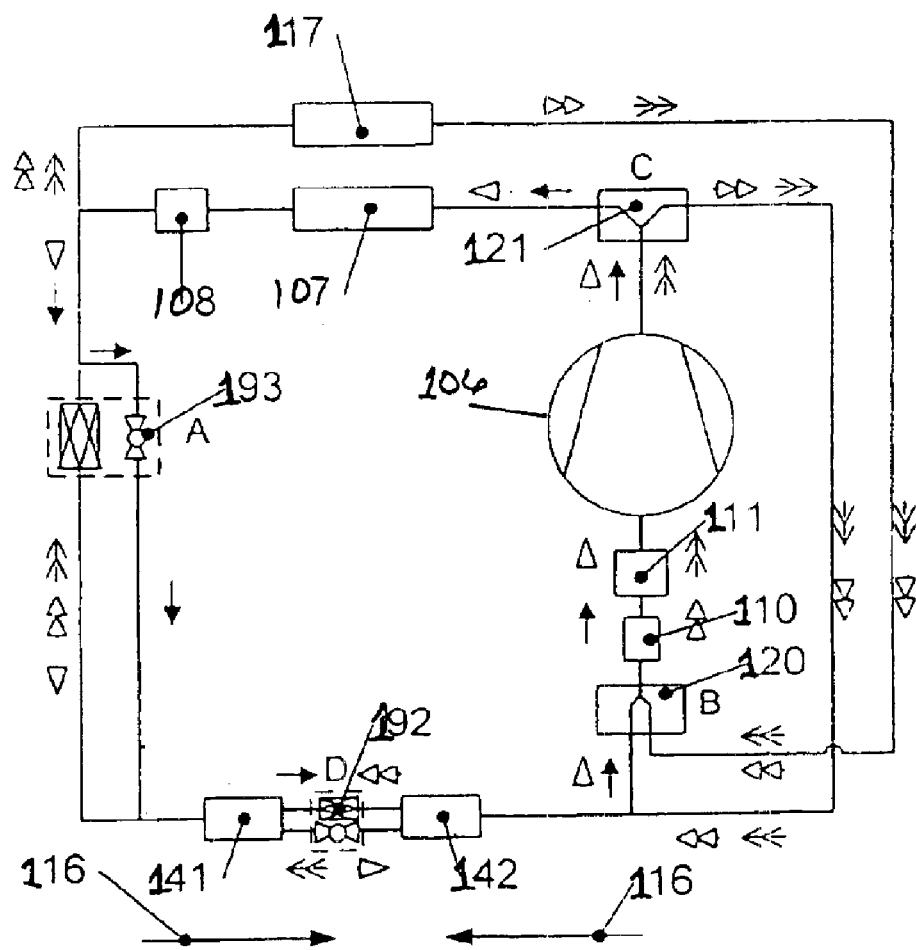
FIG. 7 shows the combined cooling plant/heat pump with expansion valves passable in both directions, with bypass.

In a further advantageous embodiment, the circuit (as seen in FIG. 7) is modified such that instead of the multi-way valves A 119 and D 118, combined expansion elements, that can pass in both directions and are provided with bypasses 192, 193, are used. Using this embodiment, separate cooling and heating operations with a higher cooling capacity, a different direction 116 of the air flow in the ventilation system 103 is necessary compared to the versions of combined cooling and heating operation with a higher heating demand, separate cooling or separate heating.

The concept of the invention shown in FIG. 7 ensures that, in addition to cooling and heating, the dehumidification reheating performed by the system is with significantly less discomfort and is with significantly less technical effort. The internal heat exchanger system is, as shown in FIG. 3, designed with the functional units A and B 141, 142 separated. The separate cooling and heating operates without any restrictions, compared with system of FIG. 3. The combined operation is different in that, depending on the direction of the refrigerant flow, in the circuit there is more cooling or more heating.

In the combined operation, with higher heating output with dehumidification, the refrigerant passes the functional unit B 142 and is then restricted in the expansion valve passable in both directions 192. Therefore, in the second functional unit A 141 there is a restricted refrigerant for dehumidification. If there is too little additional heating, the corresponding cooling power is also small. The air flow in the ventilation system 103 is equal with that seen in FIG. 3.

In the combined operation with higher cooling output and dehumidification, the refrigerant is released between the two functional units A and B 141, 142 of the internal heat exchanger system in the expansion valve 192, which is passable in both directions. As the refrigerant has already been cooled in the external heat exchanger 107 and inner heat exchanger 108, there is only a low heating capacity available in the functional unit A 141, but a high cooling capacity in the functional unit B 142. Therefore, this mode is called the mode with increased cooling capacity. Cooling of the refrigerant can be influenced by the speed of the engine fan.

The airflow 116 in the ventilation system 103 must be reversed in this mode, because otherwise it would be heated first and cooled afterwards. This means that the two functional units A and B 141, 142 exchanged their functions in this mode. The latter circuit is made possible, in the expansion valve passable in both directions with bypass 193, the bypass switching being chosen for the refrigerant.

This embodiment also has the advantage that the heating exchanger of the engine cooling circuit of the engine cooling system 102 is not required. Again a combined temperature/humidity sensor can decide, whether a combined circuit is used. A reduced demand in components results from, in each operational mode, only one mass flow is used.

The design of the "expansion valves passable in both directions with bypass" A and D 192, 193 is with either controllable restrictor cross-sections or as fixed restrictors.

The expansion valves passable in both directions with bypass A and D 192, 193 in separate heating or cooling plant operation can release the flow cross-section to approximately the diameter of the tube cross-section or release the bypass starting from a certain valve position. Again, this is necessary when in heating operation the refrigerant circuit only functions as heat exchanger circuit.

Again the oil circulation is ensured by corresponding speed changes of the compressor, the piston stroke or circuit switchings.

Figure 8:
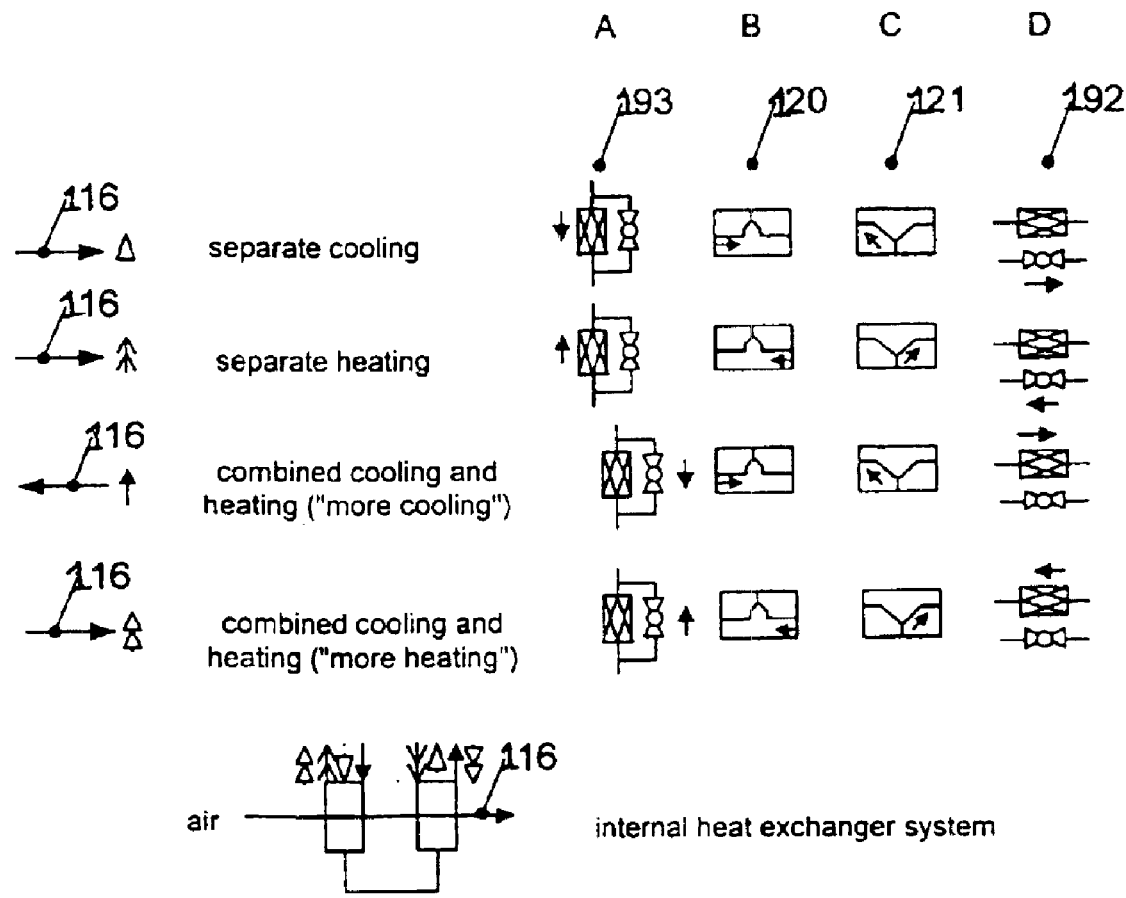
FIG. 8 is a survey on the valve positions of the multi-way valves A, B, C and D.

FIG. 8 shows a survey of the valve positions of the expansion valves passable in both directions A, D 192, 193 and the multi-way valves B 120, C 121, wherein the operational modes (separate cooling, separate heating, combined cooling and heating with higher cooling capacity, and combined cooling and heating with higher heating capacity) are given the corresponding arrows 116 indicating the flow direction of the air in the ventilation system 103.

Figure 9:
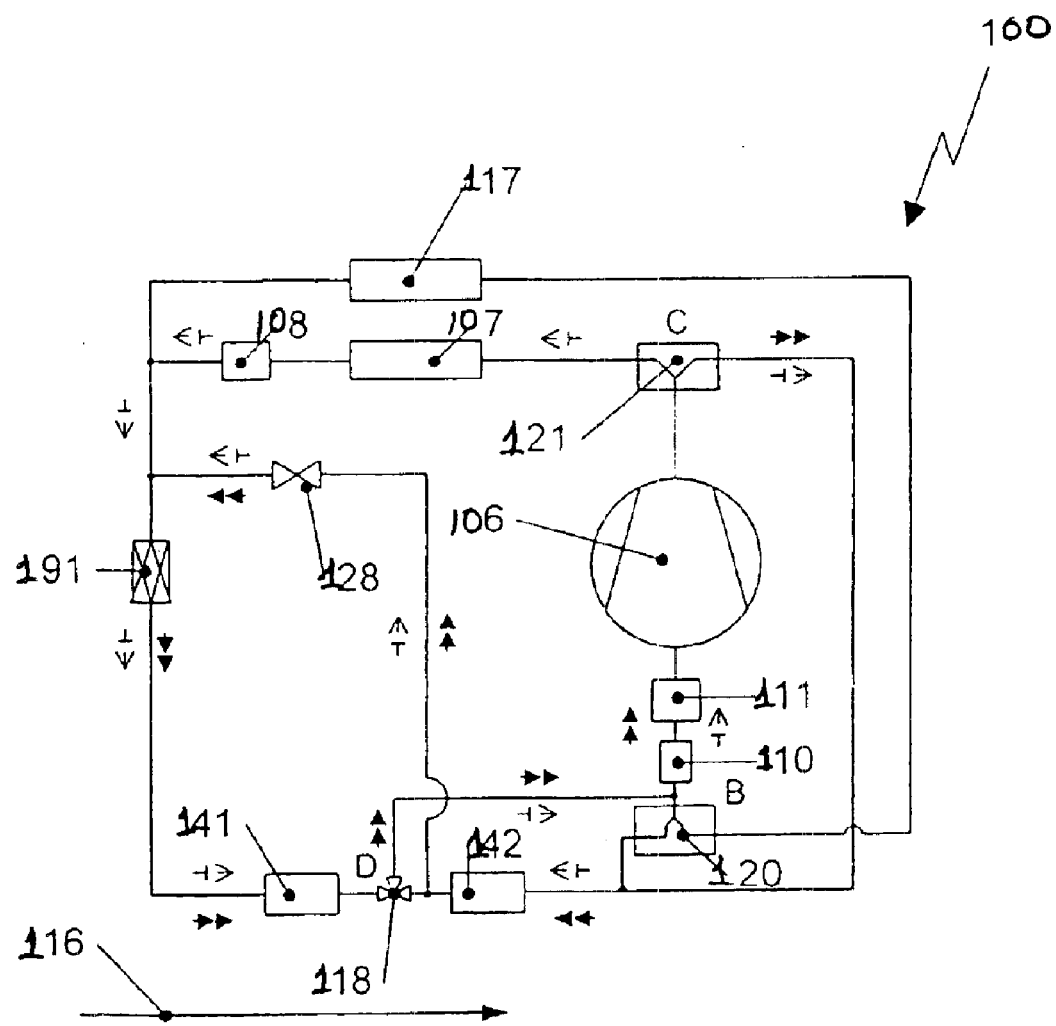
FIG. 9 shows the combined cooling plant/heat pump in combined dehumidification/reheating operation.

In FIG. 9 a combined cooling plant/heat pump 100 in combined dehumidification/reheating operation is shown. Here the arrangement according to the invention of the components makes possible the combined dehumidification-reheating operation, with or without separation or division of the refrigerant mass flow.

With the switching of the refrigerant circuit without partial flows, the refrigerant is first compressed in the compressor 106 and directed over the multi-way valve C 121 to the functional unit B 142, which here functions as condenser/gas cooler. Then the refrigerant flows over a refrigerant line with blocking element 128 to the expansion valve passable in both directions 191, is thereafter passed to and absorbs heat in the functional unit A 141 when dehumidifying the air. From the functional unit A 141, it is passed to the multi-way valve D 118, the accumulator 110 and the internal heat exchanger at low pressure 111, in which the refrigerant reflows to the compressor 106.

The system according to the invention functions in the combined dehumidification-reheating operation with divided refrigerant mass flow such that a partial refrigerant mass flow is directed through the system in the same way as in operation with non-divided refrigerant mass flow, whereas the other partial flow, after the compressor 106, is directed over the multi-way valve C 121, the external heat exchanger 107, the inner heat exchanger on the high-pressure side 108 to the expansion valve passable in both directions 191, where both refrigerant mass flows reunite and are decompressed together.

The operational modes for cooling and heating can be realized using the device of FIG. 9 in a manner similar to that mentioned above.

Figure 10:
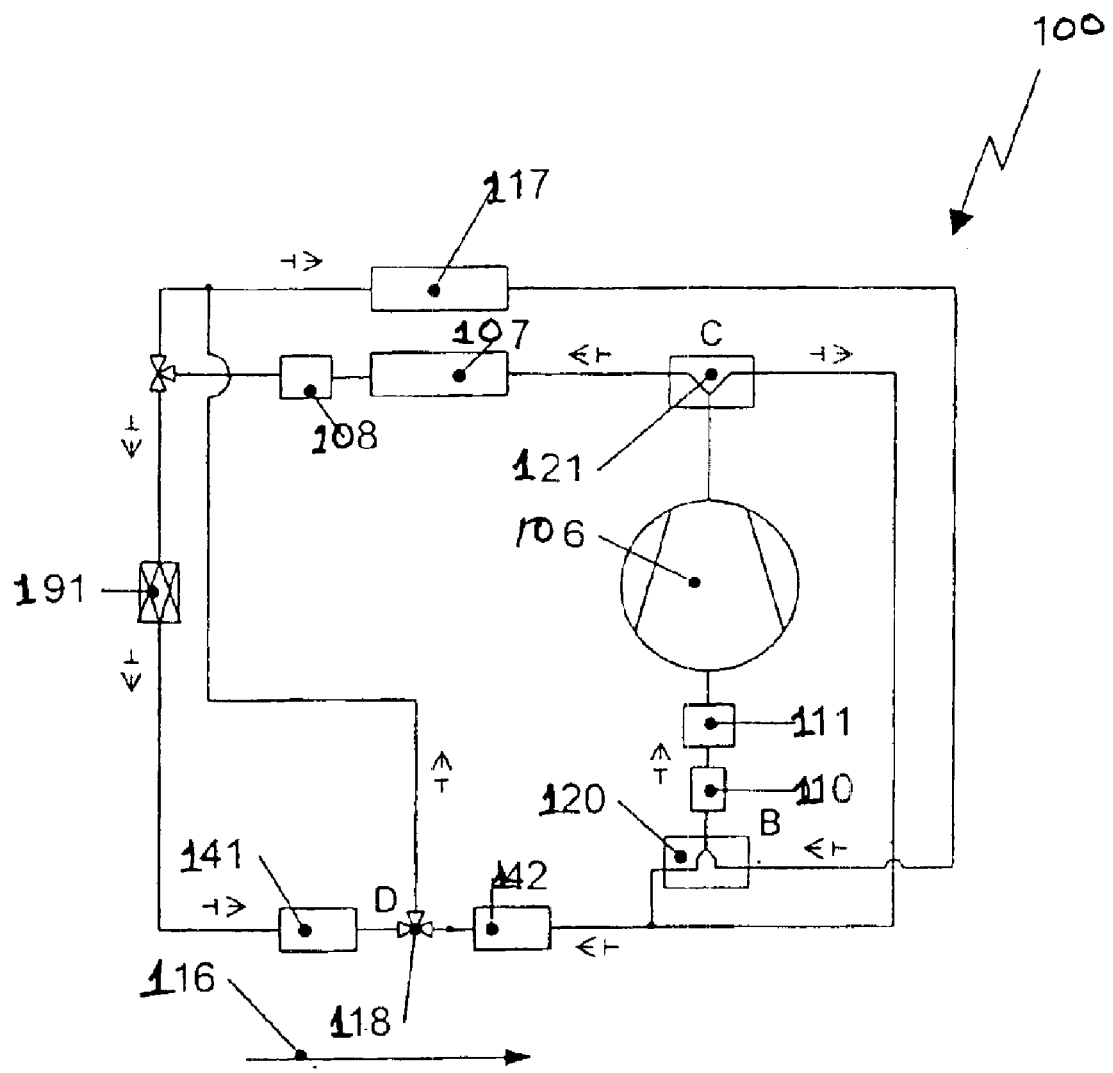
FIG. 10 shows the combined plant/heat pump in combined dehumidification/reheating operation with integrated coupling heat exchanger.

In FIG. 10, according to another advantageous embodiment of the invention, one refrigerant partial flow of the heat pump circuit, or the united total refrigerant mass flow of the cooling plant and heat pump circuits, is passed through the coupling heat exchanger 117.

Overheating is controlled by a valve switched in a clocked way in the engine cooling circuit 102. The multi-way valve D 118 has, in this case, an additional blocking element at the connection 125.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. A combined cooling plant/heat pump for use in motor vehicles to cool, heat and dehumidify the vehicle interior, said combined cooling plant/heat pump comprising:

a ventilation system adapted to provide air to the vehicle interior;

a refrigeration circuit including a heat exchanger having a first functional unit and a second functional unit located within the ventilation system, both of said first and second functional units being a condenser during heat pump operation of said combined cooling plant/heat pump, both of said first and second functional units being an evaporator during cooling plant operation of said combined cooling plant/heat pump, and one of said first and second functional units being an evaporator and the other of the first and second functional units being a condenser during combined dehumidification-reheating operation of said combined cooling plant/heat pump.

2. Combined cooling plant/heat pump of claim 1 wherein the heat exchanger with said two functional units is structurally designed as a heat exchanger.

3. Combined cooling plant/heat pump of claim 1 wherein said first and second functional units are integrated into the cooling plant/heat pump circuit over a 3/2-multi-way valve and a 4/2-multi-way valve.

4. Combined cooling plant/heat pump of claim 1 wherein said first and second functional units are connected to each other by a two-way expansion element having a bypass, and a second two-way expansion valve having a bypass being provided in the refrigerant circuit.

5. Combined cooling plant/heat pump of claim 1 wherein as a heat source for the heat pump operation a coupling heat exchanger is provided thermally coupled to the refrigerant circuit of the cooling plant/heat pump and a coolant circuit of the engine cooling system, whereby heat is transferred from the coolant circuit of the engine cooling system to the refrigerant circuit or the cooling plant/heat pump.

6. Combined cooling plant/heat pump of any of the claim 1 wherein an air heat exchanger is provided as heat source for the heat pump operation, in heat pump operation said air heat exchanger transferring heat from the air to the refrigerant circuit of the cooling plant/heat pump.

7. Combined cooling plant/heat pump of claim 1 wherein the heat exchanger is additionally provided with a separate heating heat exchanger of the engine cooling system within the ventilation system.

8. A method of operating a combined cooling plant/heat pump comprising the steps of dividing, in combined dehumidification-reheating operation, refrigerant mass flow downstream of a compressor into partial flows, directing one partial flow for the reheating at a first functional unit and directing another partial flow for the dehumidification at a second functional unit.

* * * * *